United States Patent [19]  [11]  4,365,479
Weghaupt et al.  [45]  Dec. 28, 1982

[54] COOLANT REPLENISHING SYSTEM FOR SUPERCONDUCTING FIELD WINDINGS

[75] Inventors: Erich Weghaupt, Mülheim; Lutz Intichar; Christoph Schnapper, both of Erlangen, all of Fed. Rep. of Germany

[73] Assignee: Siemens Aktiengesellschaft, Munich, Fed. Rep. of Germany

[21] Appl. No.: 203,967

[22] Filed: Nov. 4, 1980

[30] Foreign Application Priority Data

Nov. 26, 1979 [DE] Fed. Rep. of Germany ....... 2947592

[51] Int. Cl.$^3$ ............................................. F17C 7/02
[52] U.S. Cl. ......................................... 62/55; 62/505; 310/61; 310/64
[58] Field of Search ...................... 62/55, 505; 310/54, 310/61, 64

[56] References Cited
U.S. PATENT DOCUMENTS 3,760,603  9/1973  Dicic .................................... 62/505
4,048,529  9/1977  Pomeroy et al. ..................... 62/505
4,101,793  7/1978  Berthet et al. ....................... 62/505

Primary Examiner—Ronald C. Capossela
Attorney, Agent, or Firm—Kenyon & Kenyon

[57] ABSTRACT

A coolant replenishing system for cooling the superconducting field winding of a machine, illustratively a turbo-generator. The machine is provided with a rotating antechamber in which is disposed a coolant in liquid and gaseous phases. Liquid coolant is delivered to the antechamber from a supply tank by a coolant supply line. The discharge opening of the coolant supply line in the antechamber is oriented away from the axis of rotation of the machine, and disposed at a predetermined radius with respect to the axis so that the input pressure of the coolant at the opening of the coolant feed line is in equilibrium with the pressure of the liquid coolant in the rotating antechamber.

9 Claims, 1 Drawing Figure

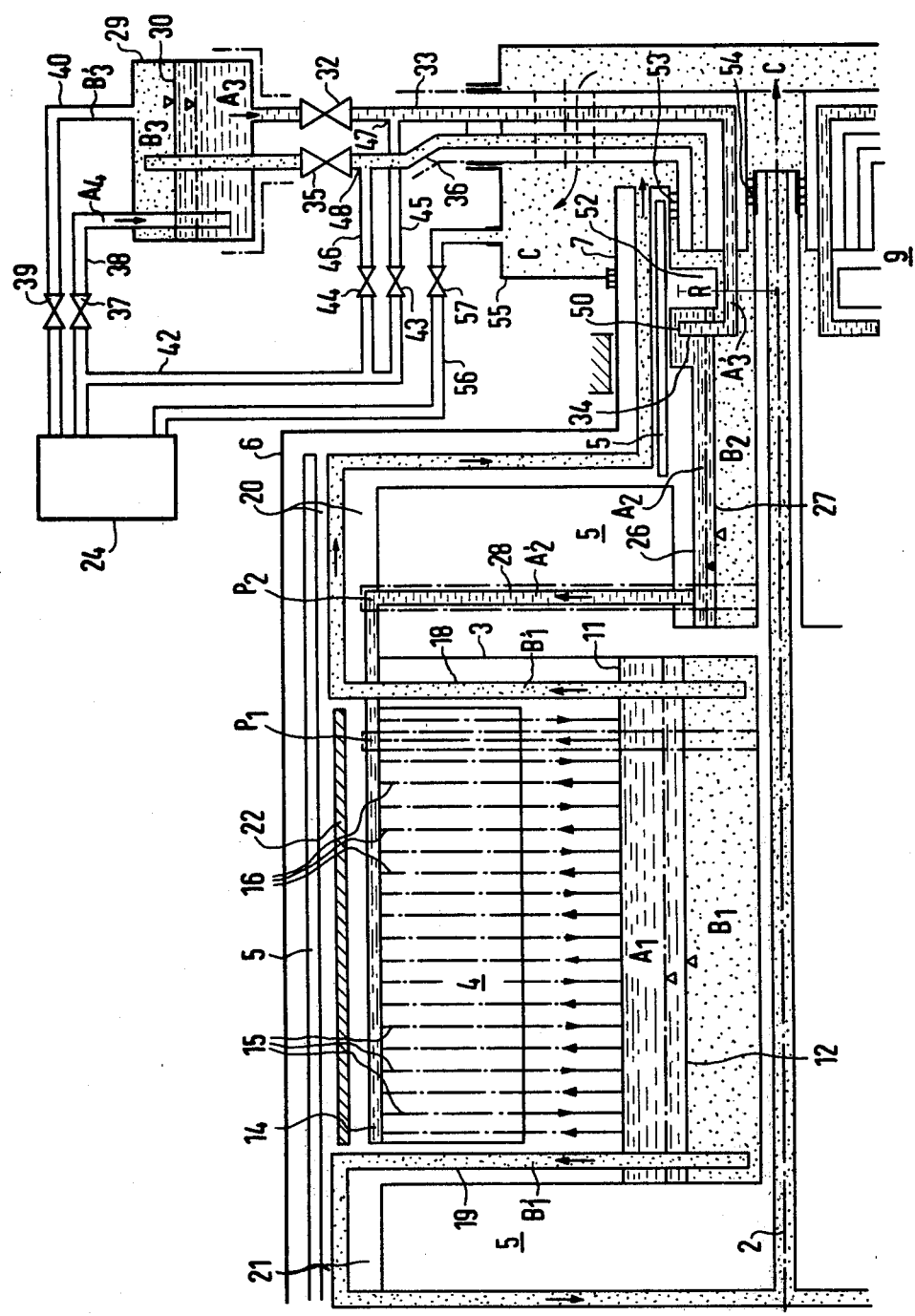

COOLANT REPLENISHING SYSTEM FOR SUPERCONDUCTING FIELD WINDINGS

BACKGROUND OF THE INVENTION

This invention relates generally to machines which operate in cryogenic superconductive states, and more particularly, to a coolant feed system for a superconductive electric machine, illustratively a turbo-generator, in which a cryogenic coolant in liquid and gaseous phases is delivered to the machine by stationary coolant feed lines, connected to external coolant sources.

One coolant replenishing system which allows flood or bath cooling of a superconducting winding in an electric machine, particularly a turbo-generator is described in German Offenlegungsschrift No. 29 23 496. The system described therein contains an antechamber which is disposed near the axis of rotation of the machine, and rotates therewith. A further cooling device, which contains a rotating mixing chamber in which coolant in liquid and gaseous phase states is contained, is disclosed in German Patentschrift No. 28 30 887 C3. In operation, the rotation of the mixing chamber causes the liquid and gaseous phases of the coolant to separate from each other by centrifugal forces. Thus, gaseous coolant settles in the portions of the mixing chamber which are near the axis of rotation, and the liquid coolant, which is used for cooling the field winding of the machine, remains in the portion of the mixing chamber away from the axis.

The liquid coolant is distributed throughout the electric machine by a self-pumping effect utilizing thermo-siphon loops. Such thermo-siphon loops operate using the principle that the liquid and the gaseous phases of the coolant are characterized by different specific densities. A coolant distribution system is provided at the outer circumference of the field winding. The coolant distribution system is connected by a plurality of cooling canals which conduct the coolant through the field winding and to the outer portion of the mixing chamber.

In an operating machine, all cooling canals in the field winding are completely flooded and filled with liquid helium from the coolant distribution system at the outer circumference of the winding. As the coolant absorbs heat from the field winding and the external environment, its density decreases. This decrease in density causes the coolant to flow in the cooling canals towards the mixing chamber. Simultaneously, colder and therefore denser coolant flows radially outward by means of coolant connecting lines into the coolant distribution system, and subsequently to the cooling canals. A pressure gradient develops along the cooling canals through the winding as a result of heat absorption. This produces convection flow in the system in the form of thermo-siphon loops (see: "Cryogenics", July, 1977, pages 429–433; and DE-OS No. 25 30 100). The rate of the circulating flow is increased as larger amounts of heat are absorbed by the coolant, thereby producing a fail-safe cooling operation.

The gaseous coolant which is located near the axis of rotation in the mixing chamber is advantageously utilized to produce a counter flow for cooling connecting elements of the body of the rotor which carries the field winding. Such cooling substantially reduces the amount of heat which is introduced into the machine from the environment. In the course of such cooling, the gaseous coolant absorbs sufficient heat to be raised from a few degrees K to approximately room temperature, and becomes correspondingly less dense. Since the warming-up of the gaseous coolant takes place at a long radius from the axis of rotation, but the cold gaseous coolant enters the loop in the vicinity of the axis of rotation, a pumping effect is achieved. If the output pressure of the gaseous coolant from the mixing chamber is maintained at a constant pressure, illustratively 1.1 bar, the resulting pump would produce an under pressure in the mixing chamber of illustratively between 0.3 and 0.6 bar. As a result of the thermodynamic characteristics of helium, the reduction in pressure causes a drop of about 1 degree K, and, therefore a higher current-carrying capacity in the superconducting winding.

In such a cooling arrangement, coolant must be replenished at low pressure and low temperature. A refrigerator plant must therefore be provided which supplies undercooled helium at low pressure. In addition to costing more than a plant which operates at normal pressure, difficulties are encountered in the maintaining of undercooled helium. Moreover, the extremely cold machine parts draw warm gases from the environment, as a result of the underpressure, thereby creating difficulties in sealing the system.

As a result of these problems, pressure reduction stages which rotate with the winding have been provided so as to permit the refrigeration plant and the coolant feed lines to be operated at an optimum pressure of approximately 1.2 bar. One such pressure reduction stage which is provided in a system for replenishing helium which is conducted from a helium supply tank to a helium bath in the rotor of a superconducting generator is described in the above-mentioned German patent application P No. 29 23 496.6. In this system, a rotating antechamber which is located near the axis of rotation of the generator is provided in a coolant feed system. Helium is supplied to the antechamber from an external supply by means of a stationary coolant feed line. Since this helium is in liquid and gaseous phases, the gaseous coolant settles near the axis of rotation when the rotor rotates. The liquid coolant is separated from the gaseous coolant, and occupies a region in the antechamber which is radially away from the axis of rotation. Thus, the antechamber operates as a phase separator.

In this arrangement, the pressure differential between the coolant pressure in the antechamber and the under-pressure in the rotating helium bath for the field winding is achieved by a relatively warm coolant column in a feed line between the supply chamber and the helium bath. The coolant column is maintained at a pressure which equals the colder coolant column of the helium bath. The level of the liquid-gas phase boundary in the rotating helium bath for the field winding is determined by the radius of the liquid-gas phase boundary in the antechamber. Accordingly, if the proportion of liquid coolant in the helium bath decreases as a result of losses, then the pressure of the rotating coolant column in the bath must decrease correspondingly in order that coolant can flow from the antechamber into the bath. The liquid coolant flowing out of the antechamber must then be replaced with coolant which is fed in from the outside. The level of the liquid-gas phase boundary in the phase separator must therefore be controlled by level controllers in the coolant replenishing system. Such level controllers, which may be temperature monitoring sensors which operate in conjunction with control valves, are disadvantageously large, expensive, and unreliable.

It is, therefore, an object of this invention to provide a coolant replenishing system for an antechamber in a superconducting electric machine, wherein the supply of coolant which is provided from an external source is controlled as a function of coolant loss.

SUMMARY OF THE INVENTION

The foregoing and other objects are achieved by this invention which provides a coolant replenishing system wherein the outlet of a stationary coolant feed line is located in an outer region of an antechamber, and oriented away from the axis of rotation. The outlet of the stationary coolant feed line is located at a predetermined radial distance from the axis of rotation so that the pressure of the coolant at the outlet is in equilibrium with the pressure of the liquid coolant in the antechamber during normal operation of the machine.

As liquid coolant is drawn from the antechamber, the reduced supply of liquid helium remaining in the antechamber generates, as a result of antechamber rotation, a correspondingly lower counter pressure at the point where the outlet of the stationary coolant feed line is disposed. Thus, since the input pressure is higher than the counter pressure of the remaining liquid coolant supply, coolant will flow into the antechamber until the predetermined amount of liquid coolant is restored and the equilibrium pressure is reestablished. It can be seen, therefore, that the coolant replenishing system according to the present invention is self-regulating with respect to the demand for liquid coolant by the machine. Such self-regulation maintains a substantially constant level of liquid coolant in the antechamber without the need for additional controls.

In a further embodiment of the invention, the coolant replenishing system may be incorporated as part of a cooling arrangement which contains coolant feed lines connecting the radially outer region of the antechamber to a coolant distribution system which is arranged at the circumference of the superconducting field winding. This embodiment further comprises a rotating mixing chamber near the axis of rotation of the machine. During normal operation of the machine, the mixing chamber contains liquid and gaseous coolant. Coolant canals which extend through the field winding, and coolant connecting lines outside the field windings, interconnect the coolant distribution system and the mixing chamber. At least one coolant discharge line is disposed near the axis of rotation of the mixing chamber for discharging gaseous coolant from the mixing chamber to the outside. This discharge line may extend radially from the axis of rotation so as to produce a reduction in the pressure between the antechamber and the mixing chamber, and thereby improve coolant flow through the machine.

BRIEF DESCRIPTION OF THE DRAWING

Comprehension of the invention is facilitated by reading the following detailed description in conjunction with the annexed drawing which shows portions of a superconducting electric machine having a coolant replenishing system which operates in accordance with the principles of the invention.

DETAILED DESCRIPTION

The FIGURE shows a cooling arrangement which is intended for use in a superconducting field winding in the rotor of an electric machine, illustratively a turbogenerator. Portions of the rotor and machine which are not show in the FIGURE are described in DE-OS No. 24 39 719, or DE-OS No. 25 03 428. The FIGURE shows an upper half of a rotor with a coolant arrangement which comprises a coolant replenishing system. Rotating parts which are to be cooled are disposed in a vacuum, so as to limit the amount of heat which is conducted to these parts from the environment.

A superconducting field winding 4 is arranged on a rotor body 3 which is supported concentrically about a shaft (not shown) having an axis 2. The rotating parts are surrounded by evacuated spaces 5 which are contained within a rotating cylindrical vacuum housing 6 which is at room temperature or warmer. An end portion 7 of vacuum housing 6 is designed integrally as part of a connecting head 9 of the rotor. Connecting head 9, as will be discussed hereinbelow, is provided with means for receiving and discharging coolant which is required for cooling field winding 4.

The cooling arrangement contains a rotating mixing chamber 11, which is near axis 2 and which contains a bath of coolant which is boiling at underpressure. In this embodiment, helium is provided as the coolant because winding 4 is comprised of superconductive material. As the rotor rotates, a phase separation is produced in mixing chamber 11 as a result of centrifugal forces. Thus, liquid helium $A_1$ settles concentrically about gaseous coolant $B_1$ which is held near the axis rotation. A similar arrangement is described in German patent application P No. 28 30 887.4.

A boundary 12 in mixing chamber 11 is a surface which separates the gaseous and liquid coolant phases. A coolant distribution system 14 is connected to mixing chamber 11 by cooling canals 15 and coolant connecting lines 16. Cooling canals 15 conduct coolant from distribution system 14, through winding 4, and to mixing chamber 11. Coolant connecting lines 16 are outside of winding 4 and supply liquid coolant from mixing chamber 11 to distribution system 14.

The cooling of superconducting field winding 4 is achieved by a self-pumping effect in thermo-siphon loops. In essence, cold liquid helium $A_1$ is pumped from mixing chamber 11 to the coolant distribution system 14 by means of the radially arranged cooling connecting lines 16. As indicated, the cold liquid helium is then utilized to cool superconducting field winding 4 by cooling canals 15. As a result of heat which is accumulated in the coolant from the environment and heat dissipation from field winding 4, the density of the coolant in the coolant connecting lines and in the cooling canals is reduced, thereby producing a corresponding reduction in the hydrostatic pressure. Such hydrostatic pressure differences cause the coolant to return to mixing chamber 11 radially inward by means of cooling canals 15.

Evaporated coolant $B_1$, which is collected in mixing chamber 11 during normal operation of the machine is suctioned off to the outside by exhaust gas lines 18 and 19. Such gas is exhausted by also using the self-pumping effect described hereinbelow with respect to the liquid coolant. Gaseous coolant $B'_1$ which is in exhaust lines 18 and 19, and which has been drawn from mixing chamber 11 at a point near axis of rotation 2, is warmed by being utilized for cooling rotor elements such as connecting elements 20 and 21, which are relatively warm, and other parts of the machine rotor. Such other rotor parts may, for example, be a cylinder 22 which operates as an electromagnetic damper and is only partially shown in the FIGURE. Connecting elements 20 and 21 which are disposed at a substantial radius from axis of rotation 2, are cooled by coolant gas $B'_1$ to the temperature of vacuum housing 6. Such cooling is achieved in a direction countered to the heat flow, thereby permitting these elements to be considered as counter flow coolers. Coolant gas $B'_1$ which absorbs the heat from connecting elements 20 and 21 is discharged centrally from the rotor at connecting head 9 and conducted to refrigeration plant 24, as indicated in the FIGURE.

As indicated above with respect to the flow of liquid coolant, the self-pumping effect of gaseous coolant $B'_1$ is caused by differences in density between cold and warm coolant gas. If the output pressure gas is held constant, a coolant underpressure in the mixing chamber of illustratively 0.4 bar is produced. This results in a lowering of the temperature of the coolant by approximately 1 degree K.

The liquid helium which is required for cooling the superconducting field winding is supplied to distribution system 14 from a rotating antechamber 26 which is arranged near the axis of rotation and connecting head 9. During normal operation of the machine, antechamber 26 contains liquid coolant $A_2$ which is settled in regions away from axis of rotation 2 by centrifugal forces caused by rotation of the antechamber. The liquid coolant surrounds gaseous coolant $B_2$ which is located near the axis of rotation. A boundary surface 27 separates the liquid and gas coolant phases. A coolant feed line 28 is connected to rotating antechamber 26 at a region away from axis of rotation 2 and extends radially so as to conduct liquid coolant $A'_2$ from the antechamber to coolant distribution system 14 at the outer circumference of field winding 4.

A pressure reduction stage (not shown) is provided between antechamber 26 and field winding 4 so as to create a state of equilibrium between pressure $P_1$ of the coolant at the outer circumference of field winding 4, and pressure $P_2$ at the radially outer end of feed line 28. Such a pressure equalizing system is required because the respective helium columns from mixing chamber 12 and antechamber 26 are at different pressures densities and temperatures. One pressure reduction stage which may be utilized to achieve the desired pressure equalization is described in Offenlegungsschrift No. 29 23 496. The levels of liquid-gas boundaries 27 and 12 are in a feedback relationship with respect to one another. Thus, a lowering of the level of boundary 12 in mixing chamber 11 toward a larger radius causes pressure $P_1$ to drop. Consequently, helium can flow through feed line 28 of the pressure reduction stage until equilibrium between pressures $P_1$ and $P_2$ is restored.

Liquid coolant $A'_3$ is supplied to rotating antechamber 26 from an external supply tank 29. Supply tank 29 is arranged geodetically higher than antechamber 26, and contains liquid coolant $A_3$ and gaseous coolant $B_3$, at a pressure of about 1.2 bar. The gaseous and liquid phases are separated by a boundary 30. A line 33 is provided between antechamber 26 and supply tank 29 which is controlled by a valve 32 for conducting liquid coolant. Line 33 begins at the bottom region of supply tank 29, extends into antechamber 26, and is provided with a radially outward extending stationary section 34 which is provided with an outlet 50. A further line 36 having a valve 35 is provided for exchanging cold coolant gas between the gas space of supply tank 29, which is formed above coolant $A_3$, and the region near axis of rotation 2 in antechamber 26. Such a gaseous exchange may be achieved even though gaseous coolant $B_3$ in supply tank 29 and gaseous coolant $B_2$ in antechamber 26 are at approximately the same pressure of 1.2 bar. In some embodiments, line 26 can be arranged concentrically around line 33 which conducts liquid helium so as to improve the thermal insulation of the liquid helium.

Liquid coolant $A_4$ from an external refrigeration plant 24 can be fed into supply tank 29 by means of a connecting line 38 having a shut off valve 37. Gaseous coolant $B'_3$ can be returned from the supply tank to the refrigeration plant by means of a line 40 having a shut off valve 39. Coolant line 42 branches off of line 38 at a point between valve 37 and the refrigeration plant, and is itself branched off into two sections 45 and 46 having respective valves 43 and 44. These lines lead into main lines 33 and 36 which extend between antechamber 26 and supply tank 29, the discharge points 47 and 48 being located between valves 32 and 35, and the antechamber.

The coolant replenishing system disclosed above insures that a sufficient quantity of liquid helium $A_2$ is always available in antechamber 26 even if large quantities of liquid helium $A'_2$ flow into coolant distribution system 14 through coolant feed line 28. The maintaining of a suitable level of liquid $A_2$ in antechamber 26 is achieved by the advantageous orientation of stationary coolant feed line 33 in the antechamber. Coolant feed line 33 is provided with a radial section 34 having a discharge opening 50 so as to discharge coolant into the region of antechamber 26 which is away from rotating axis 2. The discharge opening is disposed a predetermined radius R from axis of rotation 2. Predetermined radius R is selected so that the pressure of coolant $A'_3$ at discharge opening 50 is in equilibrium with the pressure of liquid coolant $A_2$ which rotates in the antechamber during the normal operation of the machine. As previously noted, such rotation produces a gradient of hydrostatic pressure in the antechamber which varies radially from the axis of rotation. The magnitude of the hydrostatic pressure is a function of the level of liquid-gas phase boundary 27, and the rate of rotation of the antechamber. Thus, if the level of boundary 27 is displaced outward, then the pressure at discharge point 50 drops accordingly, and liquid helium can flow into antechamber 26. If, on the other hand, the radius of the phase boundary level recedes toward the axis of rotation, the pressure at the discharge point rises, and the supply of liquid helium is discontinued. In this manner, the supply of liquid helium in antechamber 26 is automatically regulated. In one embodiment, antechamber 26 rotates at 50 revolutions per second and liquid coolant discharge outlet 50 is disposed at a radius of 5 centimeters from the axis of rotation. In such an embodiment, the acceleration of liquid coolant along portion 34 of the coolant supply line is 500 times the acceleration which would be due only to gravity. In addition, the radial position of phase boundary 27 changes only very little with a change in the level of boundary 30 in supply tank 29. A drop of 1 meter in the level of boundary 30 results in a drop of approximately only 2 millimeters in the level of boundary 27. Such minor variations in the level of phase boundary 27 in view of large excursions in the level of phase boundary 30 in supply tank 29 permit extended operation of the machine during temporary failure of refrigeration plant 24.

In the embodiment shown in the FIGURE, a radially disposed partition 52 is provided at one end of the rotor shaft in connecting head 9, and near discharge opening 50. Partition 52 prevents liquid coolant $A_2$ in antechamber 26 from communicating with seals 53. Seals 53 are disposed at a radius with respect to axis of rotation 2 which is greater than that of phase boundary 27. Seals 53 communicate between rotating and stationary parts of connecting head 9. In this manner, it is assured that seals 53, as is the case with seals 54, serve only to prevent an exchange of warm and cold gas. If the pressure of the cold gas is somewhat higher than that of the warm gas, for example, 1.2 bar as against 1.1 bar, then the cold gas escaping through the gaps at these seals cools the walls according to the counterflow principle. This further reduces the losses due to the introduction of heat from the environment.

One exhaust gas, designated with the symbol "C", which escapes from exhaust gas lines 18 and 19 at the seals, is combined in a plenum 55 of connecting head 9, and conducted from there to refrigeration plant 24 by means of collecting line 56. A valve 57 may be located in collecting line 56.

In operation without disturbance, valves 32 and 35 are open, while valves 33 and 44 are closed. Refrigeration plant 24 supplies a sufficient quantity of liquid helium $A_3$ to supply tank 29. Two process variations are available for cooling-down the machine. In the first variation, the warm rotor is flooded with liquid coolant $A_3$ by opening valves 32 and 35. Although very short cooling times can be accomplished by such flooding, the rapidity of temperature change causes large temperature gradients in the rotor. Moreover, cooling efficiency is relatively poor. In the second variation, valves 32, 35, 37 and 39 are kept closed, and valves 43 and 44 are opened. This permits refrigeration plant 24 to communicate directly with main feed lines 33 and 36. Refrigeration plant 24 then supplies initially warm and then increasingly colder gas so as to cool the rotor gradually. This requires large amounts of gas, for which reason two lines, 33 and 36, are advantageously connected in parallel so as to provide a sufficiently large flow cross section. After the cooling process has advanced to the point that liquid coolant $A_2$ accumulates in antechamber 26, valves 43 and 44 are closed and valves 32, 35, 37 and 39 are opened. The supply of liquid coolant $A_3$ in supply tank 29 accelerates the cooling-down process which would otherwise be limited by the output rating of refrigeration plant 24. After thermal equilibrium and normal phase boundary levels 12 and 27 are achieved, the cooling arrangement makes an automatic transition to normal continuous operation.

During times when it is desired to warm-up the rotor, the speed of the rotor is reduced to, for example, 2.25 revolutions per second, so that the centrifugal force on liquid coolant $A_2$ in antechamber 26 is just sufficient to balance the pressure at discharge point 50 which results from the force of gravity. Valves 32, 35, and 44 are closed and liquid helium $A_2$ is either conducted into a geodetically lower tank (not shown) or, with valves 43 and 47 open, liquid coolant $A_2$ is pumped by a pump, which may be part of refrigeration plant 24, into supply tank 29 by means of lines 33, 45, 42 and 38. Since the pumping effect of connecting elements 20 and 21 as counterflow coolers is virtually eliminated as a result of the low speed of rotor rotation, the gas glow in exhaust gas lines 18 and 19 is reversed, and the pressure in the rotor rises to approximately 1.1 bar, which is the pressure of the exhaust gas system. If the pump in refrigeration plant 24 lowers the pressure on its intake side to about 1 bar, the differential pressure of 0.1 bar is sufficient to empty the liquid helium out of the entire rotor. Thereupon, the warming-up can be accomplished by blowing gas through lines 33 and 36 in a manner analogous to the cooling-down process.

In the event of a so-called "quench", wherein a portion of field winding 4 goes from super conducting to normal conducting states, the local temperature rise associated therewith would lead to increased helium evaporation. Such evaporation would produce an increase in the internal pressure, thereby causing liquid helium to be transported back to supply tank 29. Since the cross section of lines 33 and 36 can be advantageously selected at will, contrary to exhaust gas lines 18 and 19, the cross section of which in counterflow coolers 20 and 21 must be kept small because of heat transfer, a reduction in the pressure of the overall coolant feed system can be assured to a large degree. If the internal pressure of the rotor is high, antechamber 26 is flooded with liquid, and both lines 33 and 36 transport this liquid equally to supply tank 29. If the quench causes the rotor to be emptied completely, line 36 would conduct the gas which continues to flow and which is increasing in temperature, because line 33 would remain filled with liquid from the supply tank. The gas therefore does not need to flow through the liquid coolant in the supply tank, which would lead to additional evaporation.

The pressure increase resulting from a quench would also produce a rise in the temperature of the helium. This would increase the velocity of propagation of liquid helium through the winding. Since liquid helium would be pushed out of the rotor, the level of liquid-gas boundary 12 would drop toward a larger radius. As soon as inner-most conductors of winding 4 are no longer covered by liquid helium, such conductors would be cooled to a much lesser degree, thereby permitting a more uniform distribution of thermal energy throughout the winding.

Although the inventive concept disclosed herein has been described in terms of a specific embodiment and applications, other applications and embodiments will be obvious to persons skilled in the pertinent art without departing from the scope of the invention. The drawing and the description of the specific illustrative embodiment of the invention in this disclosure are illustrative of applications of the invention and should not be construed to limit the scope thereof.

What is claimed is:

1. A coolant replenishing system for a superconducting field winding in the rotor of an electric machine, the machine being of the type which has a coolant feed system which contains a rotating antechamber near an axis of rotation for containing coolant in liquid and gaseous phases, an external coolant supply tank for supplying the coolant to the rotating antechamber, and a stationary coolant supply line for connecting the external coolant supply tank to the rotating antechamber, the coolant replenishing system further comprising discharge means for the stationary coolant supply line, said discharge means having an opening located in a radially outer region of the rotating antechamber and at a predetermined radius from the axis of rotation such that an input pressure at said opening of said discharge means is in equilibrium with a pressure of the liquid coolant in the rotating antechamber during normal operation of the machine.

2. The coolant replenishing system of claim 1 wherein the external coolant supply tank is arranged geodetically higher than the rotating antechamber.

3. The coolant replenishing system of claims 1 or 2 wherein the external coolant supply tank and the rotating antechamber are each provided with respective gaseous coolant spaces, and there is further provided a gaseous coolant connecting line for communicating between said gaseous coolant space of the supply tank and said gaseous coolant space of the rotating antechamber.

4. The coolant replenishing system of claim 3 wherein the pressure of a gaseous coolant in said gaseous coolant space in the external coolant supply tank and the pressure of a gaseous coolant in said gaseous coolant space in the rotating antechamber are substantially at 1.2 bar.

5. The coolant replenishing system of claim 3, wherein there are further provided:
   refrigeration means for cooling said coolant, and
   means for conducting coolant from said refrigeration means selectably to the stationary coolant supply line and said gaseous coolant connecting line, so as to bypass the external coolant supply tank.

6. The coolant replenishing system of claim 1 wherein there are further provided:
   a cooling distribution system arranged at an outer circumference of the superconducting field winding for permitting self-pumping action of the coolant through the superconducting field winding;
   a rotating mixing chamber disposed near the axis of rotation for containing coolant in liquid and gaseous phases during normal operation of the machine;
   at least one coolant feed line for connecting said outer region of the rotating antechamber to said coolant distribution system;
   at least one cooling canal disposed through the superconducting field winding for connecting said coolant distribution system to said rotating mixing chamber;
   at least one coolant connecting line disposed outside the superconducting field winding for connecting said coolant distribution system to said rotating mixing chamber; and
   at least one coolant discharge line for expelling gaseous coolant from said rotating mixing chamber.

7. The coolant replenishing system of claim 6 wherein the superconducting field winding is cooled by a circulating flow in thermo-siphon loops through said coolant distribution system, said cooling canals, said rotating mixing chamber, and said coolant connecting lines.

8. The coolant replenishing system of claims 6 or 7 wherein coolant is drawn from the rotating antechamber to said rotating mixing chamber in response to their respective liquid-gas coolant boundary levels.

9. The coolant replenishing system of claim 1 wherein there is further provided a partition means in the rotating antechamber, said partition means being disposed radially across a liquid-gas phase boundary level of the coolant, for containing liquid phase coolant within the rotating antechamber.

* * * * *